(12) United States Patent
Jackson et al.

(10) Patent No.: US 9,065,905 B2
(45) Date of Patent: Jun. 23, 2015

(54) METHODS AND APPARATUS TO PROVIDE A NETWORK-BASED CALLER IDENTIFICATION SERVICE IN A VOICE OVER INTERNET PROTOCOL NETWORK

(71) Applicant: AT&T Intellectual Property I, LP, Atlanta, GA (US)

(72) Inventors: James Jackson, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 116 days.

(21) Appl. No.: 13/769,721

(22) Filed: Feb. 18, 2013

(65) Prior Publication Data

US 2013/0155909 A1    Jun. 20, 2013

Related U.S. Application Data

(63) Continuation of application No. 12/043,762, filed on Mar. 6, 2008, now Pat. No. 8,379,824.

(51) Int. Cl.
*H04M 3/42* (2006.01)
*H04M 1/64* (2006.01)
*H04M 3/02* (2006.01)
*H04L 29/06* (2006.01)

(52) U.S. Cl.
CPC ...... *H04M 3/42051* (2013.01); *H04M 3/42059* (2013.01); *H04M 3/42* (2013.01); *H04M 3/42042* (2013.01); *H04M 3/02* (2013.01); *H04L 65/1006* (2013.01); *H04L 65/1063* (2013.01); *H04L 65/1069* (2013.01); *H04L 65/1096* (2013.01)

(58) Field of Classification Search
CPC ............ H04L 65/1006; H04L 65/1063; H04L 65/1069; H04L 65/1096; H04M 3/02; H04M 3/42051
USPC ..................... 379/87, 201.01, 202.01, 207.16, 379/221.08, 221.09, 221.1, 221.11, 221.12; 370/352, 353, 395.3, 401, 465, 466
See application file for complete search history.

(56) References Cited

U.S. PATENT DOCUMENTS

| | | |
|---|---|---|
| 5,191,607 A | 3/1993 | Meyers et al. |
| 6,466,653 B1 | 10/2002 | Hamrick et al. |
| 6,914,966 B2 | 7/2005 | Virzi et al. |
| 6,940,954 B1 | 9/2005 | Toebes |

(Continued)

OTHER PUBLICATIONS

United States Patent and Trademark Office, "Notice of Allowance," issued in connection with U.S. Appl. No. 12/043,762, mailed Oct. 11, 2012, 24 pages.

(Continued)

*Primary Examiner* — Khai N Nguyen
(74) *Attorney, Agent, or Firm* — Hanley, Flight & Zimmerman, LLC

(57) ABSTRACT

Methods and apparatus to provide a network-based caller identification (CID) service in a voice over Internet protocol (VoIP) network are disclosed. An example method comprises receiving a session initiation protocol (SIP) communication session initiation request message comprising an early-media indicator, disabling a ringtone generator, sending a SIP ringing message containing a session descriptor in response to the early-media indicator, receiving a ringtone based on the session descriptor, and presenting the ringtone to alert a user of a requested communication session.

17 Claims, 7 Drawing Sheets

(56) References Cited

U.S. PATENT DOCUMENTS

| | | |
|---|---|---|
| 7,088,816 B2 | 8/2006 | Donnelly |
| 7,224,792 B2 | 5/2007 | Fusco |
| 7,233,658 B2 | 6/2007 | Koser et al. |
| 7,248,900 B2 | 7/2007 | Deeds |
| 7,602,901 B1 | 10/2009 | Kates et al. |
| 8,059,800 B1 | 11/2011 | Martin et al. |
| 8,068,593 B2 | 11/2011 | Batni et al. |
| 8,130,930 B2 | 3/2012 | DeMent |
| 8,139,750 B1 | 3/2012 | Piercy et al. |
| 8,249,239 B2 | 8/2012 | DeMent et al. |
| 8,379,824 B2 | 2/2013 | Jackson et al. |
| 2003/0198323 A1 | 10/2003 | Watanabe |
| 2003/0219110 A1 | 11/2003 | Tsai et al. |
| 2005/0031106 A1 | 2/2005 | Henderson |
| 2005/0143054 A1 | 6/2005 | Fogel |
| 2005/0175161 A1 | 8/2005 | Reynolds et al. |
| 2006/0045252 A1 | 3/2006 | Gorti et al. |
| 2006/0177044 A1 | 8/2006 | O'Neil et al. |
| 2006/0245418 A1 | 11/2006 | Kucmerowski et al. |
| 2007/0064900 A1* | 3/2007 | Kowalewski et al. .... 379/202.01 |
| 2007/0064921 A1 | 3/2007 | Albukerk et al. |
| 2007/0121595 A1 | 5/2007 | Batni et al. |
| 2007/0127707 A1 | 6/2007 | Koser et al. |
| 2007/0217398 A1* | 9/2007 | Batni et al. .................... 370/352 |
| 2008/0043720 A1* | 2/2008 | Kucmerowski et al. ...... 370/352 |
| 2008/0146208 A1 | 6/2008 | Ejzak et al. |
| 2009/0225745 A1 | 9/2009 | Jackson et al. |
| 2010/0254372 A1* | 10/2010 | Keller et al. .................. 370/352 |

OTHER PUBLICATIONS

United States Patent and Trademark Office, "Non-Final Office Action," issued in connection with U.S. Appl. No. 12/043,762, mailed Nov. 17, 2011, 17 pages.

Yasrebi et al., "Device and Methods for Customization of Communication Notification in a Converged Network," U.S. Appl. No. 12/023,713, filed Jan. 31, 2008, 23 pages.

Nokia Corporation "Alert Info Header," SIP Headers, copyright 2006, 7 pages.

Camarillo et al., "Early Media and Ringing Tone Generation in the Session Initiation Protocol (SIP)," Dec. 2004, 13 pages.

* cited by examiner

METHODS AND APPARATUS TO PROVIDE A NETWORK-BASED CALLER IDENTIFICATION SERVICE IN A VOICE OVER INTERNET PROTOCOL NETWORK

CROSS REFERENCE TO RELATED APPLICATION

This patent arises from a continuation of U.S. application Ser. No. 12/043,762, filed on Mar. 6, 2008, now U.S. Pat. No. 8,379,824, entitled "Methods and Apparatus to Provide Network-Based Caller Identification Service in a Voice Over Internet Protocol Network," which is hereby incorporated herein by reference in its entirety.

FIELD OF THE DISCLOSURE

This disclosure relates generally to voice over Internet protocol (VoIP) networks and, more particularly, to methods and apparatus to provide a network-based caller identification (CID) service in a VoIP network.

BACKGROUND

A "talking" caller identification service is one in which a called party hears an audible ringtone and/or session invitation arrival notification that sounds like, for example, "call from John Doe," wherein "John Doe" is the name of the calling party and/or the person associated with the calling number and/or device. In some instances, a called device translates text-based caller identification information into an audible ringtone using a text-to-speech synthesizer, and/or utilizes a provided link (e.g., a uniform resource locator) to download and/or otherwise obtain an audible ringtone from a server. The called device then presents the audible ringtone to a user of the called device.

DETAILED DESCRIPTION

Figure 1:
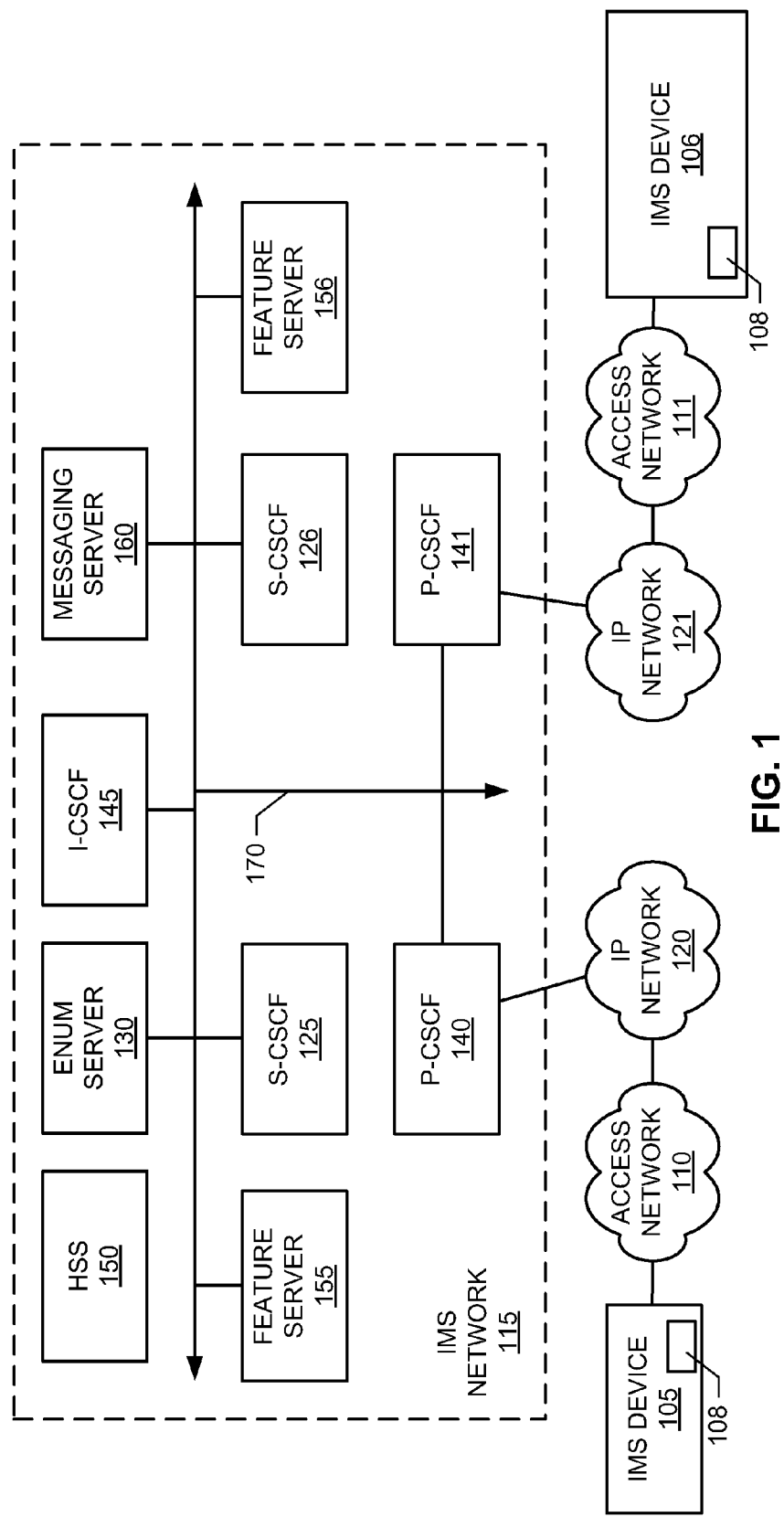
FIG. 1 is a schematic illustration of an example Internet Protocol (IP) Multimedia Subsystem (IMS) based voice over IP (VoIP) communication system constructed in accordance with the teachings of the disclosure.

Methods and apparatus to provide a network-based caller identification (CID) service in a voice over Internet protocol (VoIP) network are disclosed. A disclosed example method includes receiving a session initiation protocol (SIP) communication session initiation request message comprising an early-media indicator, disabling a ringtone generator, sending a SIP ringing message containing a session descriptor in response to the early-media indicator, receiving a ringtone based on the session descriptor, and presenting the ringtone to alert a user of a requested communication session.

A disclosed example apparatus includes a session initiation protocol (SIP) interface to receive a communication session initiation request message comprising an early-media indicator and to send a SIP response message comprising a session descriptor in response to the early-media indicator, an early media handler to receive a ringtone based on the session descriptor, and a user interface to present the ringtone to alert a user of a requested communication session.

A disclosed example method to provide a network-based caller identification service includes receiving a communication session initiation request message from a calling party, modifying the communication session initiation request to add an early-media indicator, sending the modified communication session initiation request to a called party, and when the called party responds with a session descriptor for a real-time protocol communication session, directing a messaging server to provide caller identification data associated with the calling party to the called party via the real-time protocol communication session.

Another disclosed example apparatus includes an interface to receive a communication session initiation request message from a calling party, and a caller identification module. In the disclosed example, the caller identification module is to modify the received communication session initiation request to add an early-media indicator, send the modified communication session initiation request to a called party, and when the called party responds with a session descriptor for a real-time protocol communication session, direct a messaging server to provide caller identification data associated with the calling party to the called party via the real-time protocol communication session.

Yet another disclosed example method includes receiving a request message to provide a caller identification to a called party, querying a messaging service subscriber database to determine whether a calling party associated with the request is a subscriber of a messaging service, obtaining caller identification data from the messaging service subscriber database when the calling party is a subscriber of the messaging service, and providing the caller identification data over a network to the called device.

A disclosed example messaging server includes a protocol interface to receive a request message to provide a caller identification to a called party, a caller identification server to query a subscriber database to determine whether a calling party associated with the request is a subscriber of a messaging service provided by the messaging server, and a media server to obtain caller identification data from the subscriber database when the calling party a the subscriber of the messaging server, and to forward the caller identification data to the called device.

In the interest of brevity and clarity, throughout the following disclosure references will be made to the example Internet protocol (IP) Multimedia subsystem (IMS) based voice over IP (VoIP) communication system 115, the example IP networks 120 and 121, the example access networks 110 and 111, the example feature servers 155 and 156, the example messaging server 160, and/or the example IMS devices 105 and 106 of FIG. 1. Moreover, the following disclosure will utilize SIP messages and/or message exchanges. However, it should be understood that the methods and apparatus described herein to provide a network-based caller identification (CID) service are applicable to other VoIP communication systems and/or networks (e.g., networks based on soft switches), VoIP devices, IMS devices, feature servers, messaging servers, access networks, IP networks, IMS networks and/or IMS communication systems, and/or other types of protocols, messages, and/or message exchanges. Further, while the example methods and apparatus disclosed herein are described with reference to audible (e.g., tone(s), tune(s) and/or talking) ringtones, it should be understood that the disclosed methods and apparatus be may used to provide any number and/or type(s) of ringtones, such as, but not limited to, video ringtones, audio and video ringtones, and/or picture-based ringtones.

FIG. 1 is a schematic illustration of an example IMS based VoIP communication system that includes any number and/or type(s) of IMS devices, two of which are designated at reference numerals 105 and 106. Example IMS devices 105 and 106 include, but are not limited to, an IMS (e.g., voice over Internet Protocol (VoIP)) phone, an IMS residential gateway, an IMS enabled personal computer (PC), an IMS endpoint, a wireless IMS device (e.g., a wireless-fidelity (WiFi) Internet protocol (IP) phone), an IMS adapter (e.g., an analog telephone adapter (ATA)), an IMS enabled personal digital assistant (PDA), and/or an IMS kiosk. The example IMS devices 105 and 106 of FIG. 1 may be implemented and/or be found at any number and/or type(s) of locations. Further, the IMS devices 105 and 106 may be fixed location devices, substantially fixed location devices and/or mobile devices. Moreover, the IMS devices 105 and 106 may have equipment communicatively and/or electrically coupled to them. For example, an IMS ATA may be coupled to a telephone, and/or an IMS residential gateway may be coupled to a PC and/or set-top box.

To support network-based CID services, either or both of the example IMS devices 105, 106 of FIG. 1 includes a CID handler 108. As described more fully below in connections with FIGS. 2 and/or 4, when the example CID handler 108 of FIG. 1 receives a network-based ringtone notification (e.g., a SIP INVITE message containing an early-media indicator) it responds by sending a SIP 180 RINGING message containing a session descriptor for a ringtone delivery communication session (e.g., a real-time protocol (RTP) communication session) by which an audible ringtone can be streamed to the CID handler 180. An example early-media indicator comprises a SIP ALERT-INFO header having a value of EARLY-MEDIA. An example session descriptor is constructed in accordance with the session description protocol (SDP), defined in Internet Engineering Task Force (IETF) Request For Comment (RFC) 2327. The example CID handler 108 receives the audible ringtone via the example RTP communication session, and presents the received audible ringtone as it is received to a user of the IMS device 105, 106. The audible ringtone is presented instead of, or in addition to, to any other ringtone(s) and/or communication session notification(s) provided and/or presented at the called device 105, 106. For example, a called device 105, 106 may present text-based CID information in addition to, or instead of, a network provided audible ringtone, may present the network provided audible ringtone followed by, or mixed with, a second ringtone configured locally at the called device 105, 106, etc. When the user answers the incoming communication session, the CID handler 180 terminates the RTP communication session, and the IMS device 105, 106 establishes the original communication session requested by the calling IMS device 105, 106. An example manner of implementing the example CID handler 108 of FIG. 1 is described below in connection with FIG. 4.

To access IMS communication services throughout and/or within a site, location, building, geographic area and/or geographic region, the example IMS communication system of FIG. 1 includes any number and/or type(s) of access networks, two of which are designated in FIG. 1 with reference numbers 110 and 111. In general, the example access networks 110 and 111 provide and/or facilitate a communicative coupling of the IMS devices 105 and 106 to and/or with an IMS network 115, which provides and/or enables IMS communication services (e.g., telephone services, Internet services, data services, messaging services, instant messaging services, electronic mail (email) services, chat services, video services, audio services, gaming services, voicemail, facsimile services, etc.) to the IMS device 105 and 106. However, in some examples, one or more of the IMS devices 105 and 106 may access the IMS network 115 without use of an access network 110, 111. The example access networks 110 and 111 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

While in the illustrated example of FIG. 1, each of the example IMS devices 105 and 106 are depicted as having an associated access network 110, 111, such depictions are merely illustrative. For example, the example IMS devices 105 and 106 may utilize the same access network 110, 111, an IMS device 105 and 106 may be configured and/or capable to utilize more than one access network 110, 111 at the same and/or different times, an IMS device 105 and 106 may be configured to access the IMS network 115 directly or via the IP network 120 without an intervening access network 110, etc.

To provide communication services, the example IMS based VoIP communication system of FIG. 1 includes one or more IMS networks, one of which is designated in FIG. 1 at reference numeral 115. As described more fully below, the example IMS network 115 of FIG. 1 implements and/or provides, in addition to other things, audible ringtones via a network-based CID service. In general, for an initiated communication session, a feature server 155, 156 directs a messaging server 160 to use and/or provide an audible greeting previously recorded by a calling party (e.g., during initialization, setup, configuration and/or modification of a voicemail account) as an audible ringtone for calls initiated by the calling party. If the calling party is not a subscriber of the messaging server 160, the messaging server 160 can carry out text-to-speech synthesis to create an audible ringtone from text-based CID information. The messaging server 160 provides and/or transmits the audible ringtone to a called device 105, 106 as early media (e.g., as data streamed and/or transmitted to the called device 105, 106 prior to the initially requested communication session being established between the called device 105, 106 and the calling device 105, 106). The called device 105, 106 presents the audible ringtone to alert a user of the called device 105, 106 of a requested communication session from the calling party associated with the audible ringtone.

While in the illustrated example of FIG. 1, the messaging server 160 may perform a text-to-speech synthesis to create an audible ringtone from text-based CID information, any or all of the example IMS devices 105 and 106 and/or the example feature servers 155 and 156 could, additionally or alternatively, implement, provide and/or include a text-to-speech synthesizer to create audible ringtones.

Example devices and methods that may be used to define, specify and/or customize communication notifications (e.g., ringtones) in a communication network are described in U.S. patent application Ser. No. 12/023,713, which is entitled "Device and Methods for Customization of Communication Notification in a Converged Network," and was filed on Jan. 31, 2008. U.S. patent application Ser. No. 12/023,713 is hereby incorporated by reference in its entirety.

In contrast to the example communication system of FIG. 1, in traditional IMS networks, network-based CID services require that a called IMS device be capable of retrieving a file via, for example, hyper-text transfer protocol (HTTP). Such an ability introduces a substantial amount of intelligence and/or complexity into an IMS device, and/or requires that a user of the IMS device be subscribed to a "data+voice" service rather than a "voice only" service. Moreover, accessing such files may introduce a significant and/or noticeable delay in notifying a user of an incoming call, unless the IMS device is capable of rendering audio from a file while the file is being downloaded. However, such capabilities may not be available in some IMS devices as they require a multi-threaded operating system to be executed on the IMS device. For at least these reasons, traditional IMS networks place excessive and/or undesirable processing and/or resource(s) loads on IMS devices to provide network-based CID services. As described more fully below, the methods and apparatus to provide network-based CID services in IMS networks described herein provide a more flexible, capable and/or powerful user experience while requiring and/or consuming considerably less IMS device resources.

In the example IMS communication system of FIG. 1, the example IMS devices 105 and 106 are communicatively coupled to the example IMS network 115 via one or more of the example access networks 110 and/or 111, and/or any number and/or type(s) of private and/or public IP based communication networks such as, for example, the Internet, two of which are illustrated in FIG. 1 with reference numerals 120 and 121. While in the illustrated example of FIG. 1, each of the example IMS devices 105 and 106 are depicted as having an associated IP network 120, 121, such depictions are merely illustrative. For example, the example IMS devices 105 and 106 may utilize the same public IP network, an IMS device 105 and 106 may be configured and/or capable to utilize more than one IP network 120, 121 at the same and/or different times, etc. In general, the example IP networks 120 and 121 of FIG. 1 provide and/or facilitate a communicative coupling of the IMS devices 105 and 106 to and/or with the IMS network 115.

In some examples, the IMS devices 105 and 106 may be communicatively coupled to the access networks 110 and 111 via one or more additional IP based networks and/or devices (not shown), such as a local area network (LAN), a gateway and/or a router located within a place of business, a school and/or a residence. The example IMS devices 105 and 106 of FIG. 1 are communicatively coupled to the example access networks 110 and 111, the example IP networks 120 and 121 and/or, more generally, the example IMS network 115 via any number and/or type(s) of past, current and/or future communication network(s), communication system(s), communication device(s), transmission path(s), protocol(s), technique(s), specification(s) and/or standard(s). For instance, the example IMS devices 105 and 106 may be coupled to the example access networks 110 and 111, the example IP networks 120 and 121, and/or the example IMS network 115 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, any or all of the example IMS network 115, the example access networks 110 and 111, and/or the example IP networks 120 and 121 of FIG. 1 may extend geographically to include one or more locations near to and/or encompassing one or more of the IMS devices 105 and 106. For example, the access network 110 may include a wireless access point (not shown) by which, for example, a WiFi IP phone 105 connects to the IP network 120 and the IMS network 115.

In the example IMS communication system of FIG. 1, the example access networks 110 and 111, the example IP networks 120 and 121, and the IMS network 115 need not be owned, implemented, and/or operated by a single service provider. For example, the IMS devices 105 and 106 may access IMS services provided by an IMS network 115 owned, operated and/or implemented by a first service provider via access networks 110 and 111, which are owned, operated and/or implemented by one or more additional service providers. However, any or all of the access networks 110 and 111, the IMS network 115 and/or the IP networks 120 and 121 may be operated by the same service provider.

In the illustrated example IMS communication system of FIG. 1, each IMS device (e.g., the example IMS devices 105 and 106) that is registered to the example IMS network 115 is associated with and/or assigned to a serving call session control function (S-CSCF) server (two of which are designated in FIG. 1 with reference numerals 125 and 126). The example S-CSCF servers 125 and 126 of FIG. 1 are responsible for handling incoming and/or outgoing IMS communication sessions (e.g., telephone calls, and/or data and/or video sessions) associated with its registered IMS devices 105 and 106.

While two S-CSCF servers 125 and 126 are illustrated in FIG. 1, the IMS network 115 may include any number and/or type(s) of S-CSCF servers, and each such S-CSCF server may support any number and/or type(s) of IMS devices 105 and 106. The example S-CSCF servers 125 and 126 of FIG. 1 perform session control, maintain session states and/or enable communications with call feature servers (e.g., the example application servers 155, 156 of FIG. 1) for its associated and/or registered IMS devices 105 and 106. For instance, when the calling IMS device A 105 initiates, for example, an outgoing telephone call to the example IMS device B 106, a communication session initiation message (e.g., a SIP INVITE message) is routed by the IMS network 115 from the IMS device A 105 to the S-CSCF server A 125 associated with that particular IMS device A 105.

In response to the communication session initiation message, the example S-CSCF server A 125 sends an ENUM query request message to a tElephone NUMber mapping (ENUM) server 130 to obtain an identifier (e.g., a SIP uniform resource identifier (URI)) for the IMS device B 106. The identifier obtained from the example ENUM server 130 is used by the S-CSCF server A 125 to establish the requested communication session.

To provide an access entry point for an IMS device 105 and 106 into the IMS network 115, the example IMS network 115 of FIG. 1 includes any number and/or type(s) of proxy call session control function (P-CSCF) servers, two of which are designated in FIG. 1 with reference numerals 140 and 141. The example P-CSCF servers 140 and 141 of FIG. 1, among other things, route SIP messages between IMS devices 105 and 106 and their associated S-CSCF servers 125 and 126.

To locate and/or identify the S-CSCF server 125 and 126 associated with an IMS device 105 and 106, the example IMS network 115 of FIG. 1 includes any number and/or type(s) of interrogating call session control function (I-CSCF) servers, one of which is designated in FIG. 1 with reference number 145. The example I-CSCF server 145 of FIG. 1 serves as a contact point within the example IMS network 115 for connections destined for an IMS device 105 and 106 of the IMS communication system, and/or for an IMS device 105 and 106 currently located within the serving area of the IMS communication system (e.g., a roaming subscriber). For example, for a destination identified by the example ENUM server 130, the example I-CSCF 145 identifies to which S-CSCF server 125, 126 the final destination IMS device 105 and 106 is registered. IMS protocol messages (e.g., SIP messages) directed to the destination IMS device 105 and 106 are then routed to the S-CSCF server 125 and 126 identified by the I-CSCF 145.

To manage subscriber information, and/or to enable subscribers and/or servers to locate other servers, subscribers and/or destinations, the example IMS network 115 of FIG. 1 includes any number and/or type(s) of home subscriber server(s) (HSSs), one of which is designated in FIG. 1 with reference numeral 150. The example HSS 150 of FIG. 1 maintains a device profile and/or one or more preferences for each subscriber and/or IMS device 105 and 106 of the IMS network 115. The example I-CSCF server 145 of FIG. 1 uses information contained in the HSS 150 to, for example, determine and/or locate the S-CSCF server 125 and 126 associated with a particular subscriber and/or IMS device 105 and 106. As described below, the example feature servers 155 and 156 of FIG. 1 use information contained in the HSS 150 to, for example, determine whether a called IMS device 105, 106 supports network-based CID services as described herein.

To provide one or more additional call features such as, for example, network-based CID services, the example IMS network 115 of FIG. 1 includes any number and/or type(s) of application servers, two of which are designated in FIG. 1 with reference numerals 155 and 156. The example application servers 155 and 156 of FIG. 1 (also referred to herein as "feature servers") provide and/or implement additional service features to subscribers (e.g., network-based CID services, call barring, calling name delivery and/or blocking, call blocking, call forward, call busy transfer, call screening, call forking, call trace, voicemail, announcement servers, call trees, etc.). Example application servers 155 and 156 include, but are not limited to, voice over Internet protocol (VoIP) feature servers. The application servers 155 and 156 may be used to provide and/or implement call features and/or services for calling and/or called parties. In addition to any other feature server functions, any or all of the example feature servers 155 and 156 of FIG. 1 may perform and/or implement one or more functions that enable network-based CID services, as described in more detail below in connection with FIGS. 2 and/or 3. For example, when a user of an IMS device 105, 106 initiates a communication session (e.g., by dialing a telephone number), the IMS device 105, 106 sends a SIP INVITE message. The SIP INVITE message gets routed, as described above, to its associated S-CSCF 125, 126. The S-CSCF 125, 126 forwards the SIP INVITE message to its associated feature server 155, 156. The feature server 155, 156 determines whether the called IMS device 105, 106 supports network-based CID services by, for example, consulting and/or querying the HSS 150. If the called device 105, 106 supports network-based CID services, the feature server 155, 156 modifies the SIP INVITE message to include an early media indicator, and sends the modified SIP INVITE message to the called IMS device 105, 106. When the called device 105, 106 responds with a SIP 180 RINGING message containing a session descriptor for a RTP communication session by which an audible ringtone may be received, the feature server 155, 156 directs and facilitates the establishment of the RTP communication session between the example messaging server 160 and the IMS device 105, 106. The messaging server 160 streams the audible ringtone to the IMS device 105, 106 via the established RTP communication session. An example early-media indicator comprises a SIP ALERT-INFO header having a value of EARLY-MEDIA. An example session descriptor is constructed in accordance with SDP, defined in IETF RFC 2327. An example manner of implementing any or all of the example feature servers 155 and 156 of FIG. 1 is described below in connection with FIG. 3.

To collect, record, store, retrieve and/or access messages left by and/or for subscribers of the IMS network 115, the IMS network 115 includes one or more messaging servers, one of which is designated in FIG. 1 with reference numeral 160. In addition to any other messaging service functions, the example messaging server 160 of FIG. 1 provides audible ringtones to called IMS devices 105, 106, as described in more detail below in connection with FIGS. 2 and/or 5. The example messaging server 160 preferably accesses, provides and/or uses audible greetings stored by subscribers of the messaging server 160 as audible ringtones. Such audidble greetings are recorded by a user and/or subscriber of the messaging server 160 while the user is initializing, configuring, setting up and/or modifying their messaging account (e.g., a voicemail account). For example, the messaging server may record an audible greeting as the user speaks their name. Because recorded audible greetings are spoken by the actual user, the use of recorded greetings as audible ringtones are substantially preferred to audible ringtones generated via text-to-speech synthesis. However, the example messaging server 160 can, additionally or alternatively, use text-to-speech synthesis to create and/or generate audible ringtones from text-based CID information for calling parties that are not subscribers of the messaging server 160. An example manner of implementing the example messaging server 160 of FIG. 1 is described below in connection with FIG. 5.

As illustrated in FIG. 1, the example S-CSCF servers 125 and 126, the example P-CSCF servers 140 and 141, the example I-CSCF server 145, the example HSS 150, the example feature servers 155 and 156 and/or the example messaging server 160 communicate and/or are communicatively coupled via any number, type(s) and/or combination(s)

of communication paths, communication networks, busses and/or communication devices 170.

While an example IMS communication system, example IMS devices 105 and 106, and an example IMS network 115 have been illustrated in FIG. 1, the devices, networks, systems, servers and/or processors illustrated in FIG. 1 may be combined, divided, re-arranged, eliminated and/or implemented in any way. For example, the example S-CSCF servers 125 and 126, the example ENUM server 130, the example P-CSCF servers 140 and 141, the example I-CSCF server 145, the example HSS 150, the example feature servers 155 and 156, and/or the example messaging servers 160 illustrated in FIG. 1 are logical entities of the example IMS network 115. They may, therefore, be implemented separately and/or in any combination using, for example, machine accessible instructions executed by one or more computing devices and/or computing platforms (e.g., the example processing platform 9000 of FIG. 9). Further, the example IMS devices 105 and 106, the example CID handlers 108, the example S-CSCF servers 125 and 126, the example ENUM server 130, the example P-CSCF servers 140 and 141, the example I-CSCF server 145, the example HSS 150, the example feature servers 155 and 156, the example messaging servers 160, and/or, more generally, the example IMS network 115 may be implemented by hardware, software, firmware and/or any combination of hardware, software and/or firmware. Further still, the example IMS communication system, the example IMS devices 105 and 106 and/or the example IMS network 115 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/or processors. For example, an IMS network 115 may include any number and/or type(s) of media gateways, media gateway control function (BGCF) servers, breakout gateway control function (BGCF) severs, access border elements, peered border elements, proxy servers, and/or session border controllers.

Figure 2:
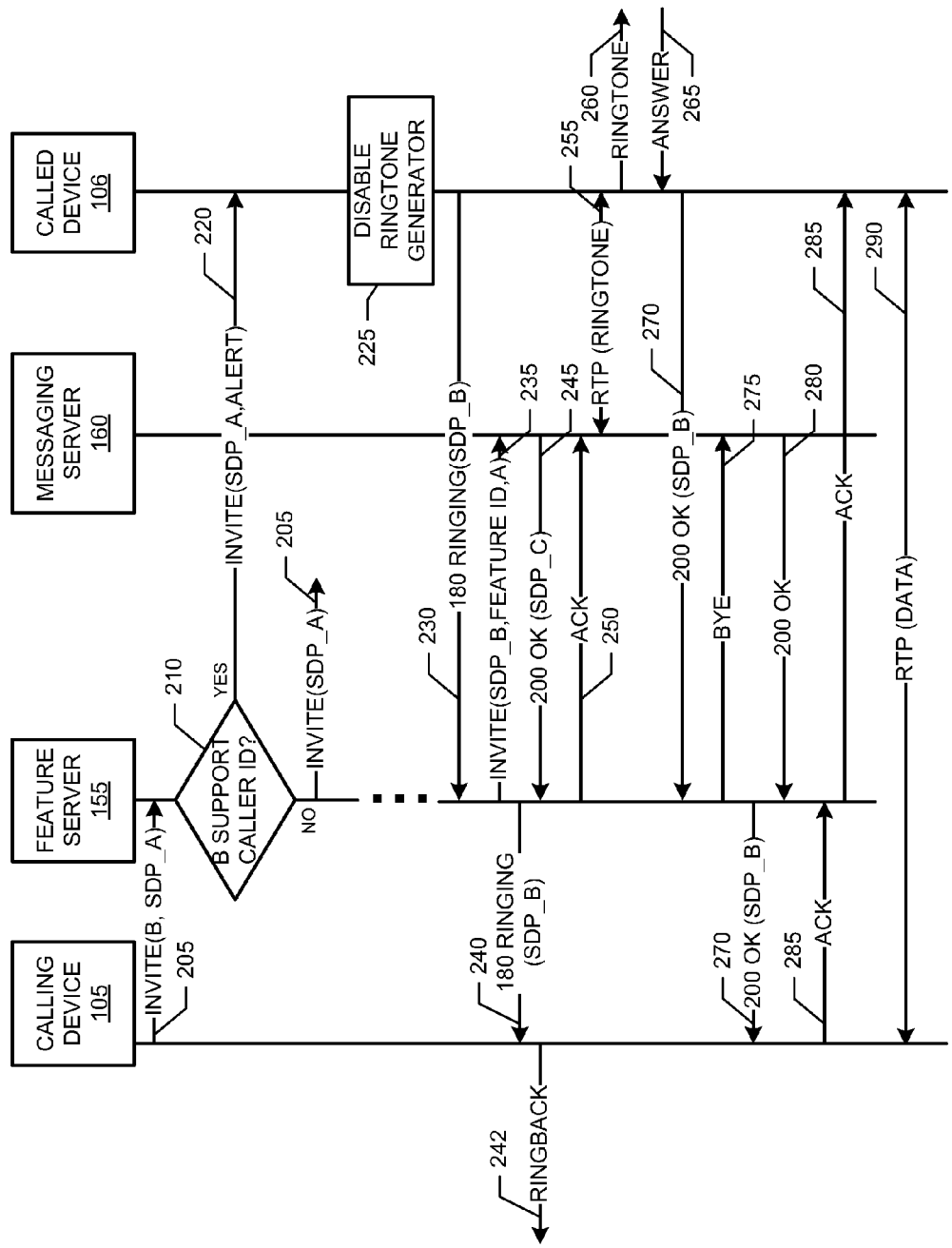
FIG. 2 illustrates example protocol message exchanges and a flowchart representative of example machine accessible instructions that may be executed to implement any or all of the example IMS devices, the example feature servers, the example messaging servers and/or, more generally, the example IMS network of FIGS. 1, 3, 4 and/or 5.
Figure 3:
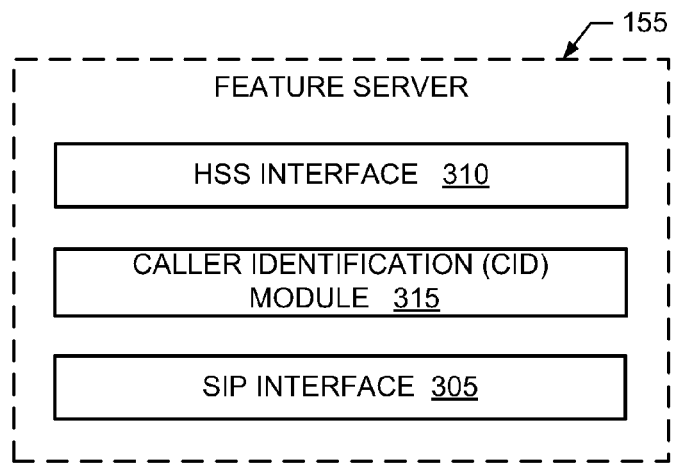
FIG. 3 illustrates an example manner of implementing any or all of the example feature servers of FIG. 1.
Figure 4:
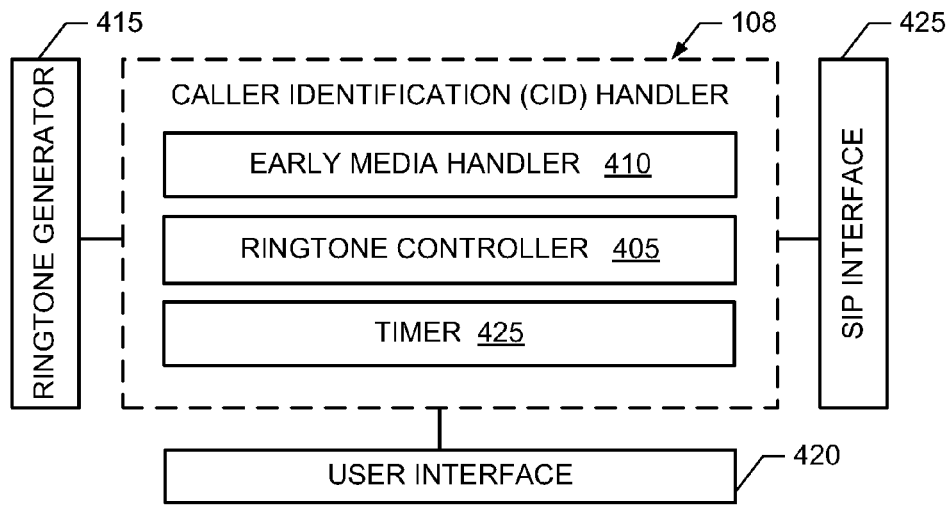
FIG. 4 illustrates an example manner of implementing any or all of the example IMS devices of FIG. 1.

FIG. 2 illustrates example protocol message exchanges, and/or a flowchart representative of example machine accessible instructions that may be executed by, for example, a processor to implement the example IMS devices 105 and 106, the example CID handlers 108, the example feature servers 155 and 156, the example messaging servers 160 and/or, more generally, the example IMS network 115 of FIGS. 1, 3, 4 and/or 5. For ease of illustration in the example of FIG. 2, the actions and/or involvement of P-SCCF servers, S-CSCF servers and I-CSCF servers omitted as their specific operations are immaterial to the discussion at hand. For example, the example message 205 in FIG. 2 that passes from the calling IMS device 105 to the example feature server 156 passes through one or more of the P-CSCF servers 140 and 141, the I-CSCF server 145 and/or the S-CSCF servers 125 and 126, but the specifics of that movement through the IMS network are further described.

The example exchanges and/or the example machine accessible instructions of FIG. 2 may be carried out by one or more processor(s), controller(s) and/or any other suitable processing device(s). For example, the example exchanges and/or the example machine accessible instructions of FIG. 2 may be embodied in coded instructions stored on a tangible medium such as a flash memory, a read-only memory (ROM) and/or random-access memory (RAM) associated with a processor (e.g., the example processor 9005 discussed below in connection with FIG. 9). Alternatively, some or all of the example exchanges and/or the example machine accessible instructions of FIG. 2 may be implemented using any combination(s) of application specific integrated circuit(s) (ASIC(s)), programmable logic device(s) (PLD(s)), field programmable logic device(s) (FPLD(s)), discrete logic, hardware, firmware, software, etc. Also, some or all of the example exchanges and/or the example machine accessible instructions of FIG. 2 may be implemented manually or as any combination(s) of any of the foregoing techniques, for example, as any combination of firmware, software, discrete logic and/or hardware. When any of the appended claims are read to cover a purely software implementation, at least one of the example IMS devices 105 and 106, the example CID handlers 108, the example feature servers 155 and 156, the example messaging servers 160 and/or, more generally, the example IMS network 115 are hereby expressly defined to include a tangible medium such as a memory, a DVD, a CD, etc. Many other methods of implementing the example IMS devices 105 and 106, the example CID handlers 108, the example feature servers 155 and 156, the example messaging servers 160 and/or, more generally, the example IMS network 115 of FIGS. 1, 3, 4 and/or 5 may be employed. For example, the order of execution of the blocks of the example flowcharts and/or the example exchanges of FIG. 2 may be changed, and/or some of the blocks and/or exchanges described may be changed, eliminated, sub-divided, and/or combined. Additionally, any or all of the example exchanges and/or the example machine accessible instructions of FIG. 2 may be carried out sequentially and/or carried out in parallel by, for example, separate processing threads, processors, devices, discrete logic, circuits, etc.

The example protocol message exchanges of FIG. 2 begin with the example calling IMS device 105 sending a communication session initiation message 205 (e.g., a SIP INVITE message), which specifies a called IMS device 106 and a session descriptor for the requested communication session. The feature server 155 determines whether the called IMS device 106 supports network-based CID services as described herein (block 210). If the called IMS device 106 does not support a network-based ringtone (block 210), the feature server 155 forwards the SIP INVITE message 205 to the called device 106. Handling of the remainder of the requested communication session then proceeds as in a normal fashion (e.g., in a manner consist with any past, present and/or future IMS network call processing).

If the called IMS device 106 supports a network-based ringtone (block 210), the feature server 155 modifies the SIP INVITE message 205 by adding an early-media indicator, such as an ALERT-INFO header having a value of EARLY-MEDIA, and sends the modified SIP INVITE message to the called device 106, as designated at reference numeral 220.

In response to the modified SIP INVITE message 210, and if the called device 106 is not already engaged in a call (e.g., busy), the called IMS device 106 disables a local ringtone generator (block 225) and sends a SIP 180 RINGING message 230 to the feature server 155. The SIP 180 RINGING message 230 contains a session descriptor for a RTP communication session via which a streaming audible ringtone can be provided to the called device 106. An example session descriptor is constructed in accordance with SDP, as defined in IETF RFC 2327.

In response to the SIP 180 RINGING message 230, the feature server 155 directs, via a SIP INVITE message 235, the messaging server 160 to provide an audible ringtone to the called device 106. The example SIP INVITE message 235 contains the session descriptor provided by the called device 106 in the SIP 180 RINGING message 230, a feature identifier indicating that an audible ringtone associated with the calling device 105 is to be provided to the called device 106, and a calling party identifier A that identifies the calling device 105. An example calling party identifier A is text-based CID information, such as a telephone number and/or a SIP URI associated with the calling device 105. The feature server 155 also sends a SIP 180 RINGING message 240 to the calling device 105 to indicate that the called device 106 is ringing. In response to the SIP 180 RINGING message 240, the calling device 105 provides a ringing indicator 242 (e.g., a ringback tone) to a calling party.

The messaging server 160 responds to the SIP INVITE message 235 with a SIP 200 OK message 245, which is acknowledged by the feature server 155 in a SIP ACK message 250. The messaging server 160 establishes a RTP communication session 255 with the called device 106, and provides an audible ringtone (e.g., a recording of the name of the calling party) to the called device 106 via the RTP communication session 255. The called devices 106 presents (e.g., plays) the received ringtone 260, and then waits for a user to answer 165 the requested communication session.

When the user answers 265 the communication session request, the called device 106 sends a SIP 200 OK message 270 to the feature server 155. The feature server 155 notifies the messaging server 160 that the communication session has been answered by sending a SIP BYE message 275 to the messaging server 160. The messaging server 160 responds with a SIP 200 OK message 280.

The feature server 155 also forwards the SIP 200 OK message 270 to the calling device 105, which the calling device 105 acknowledges via a SIP ACK message 285. The feature server 155 forwards the SIP ACK message 285 to the called device 106. The calling device 105 and the called device 106 then proceed to establish an RTP communication session 290 for the initially requested communication session.

FIG. 3 illustrates an example manner of implementing any or all of the example feature servers 155 and 156 of FIG. 1. While any or all of the example feature servers 155 and 156 of FIG. 1 may be represented by FIG. 3, for ease of discussion, the device of FIG. 3 will be referred to as feature server 155. To allow the example feature server 155 of FIG. 3 to operate as a SIP feature server, the example feature server 155 includes a SIP interface 305. The example SIP interface 305 of FIG. 3 allows the feature server 155 to exchange (e.g., send and/or receive) any number and/or type(s) of SIP messages with other device(s) and/or server(s) of the example IMS communication system of FIG. 1 (e.g., any of the example S-CSCF servers 125 and 126, the example messaging platform 160, and/or any of the example IMS devices 105 and 106).

To perform queries of a HSS (e.g., the example HSS 150 of FIG. 1), the example feature server 155 of FIG. 3 includes an HSS interface 310. The example HSS interface 310 of FIG. 3 implements and/or provides one or more application programming interfaces (APIs) via which queries of the HSS may be performed. For example, the HSS interface 310 may be used to determine whether a called device 105, 106 supports network-based CID services.

To provide network-based CID services, the example feature server 155 of FIG. 3 includes a CID module 315. As described more fully above in connection with FIG. 2, when a user of an IMS device 105, 106 initiates a communication session (e.g., by dialing a telephone number), the IMS device 105, 106 sends a SIP INVITE message. The SIP INVITE message gets routed to a CID module 315 of an associated feature server 155. The example CID module 315 of FIG. 3 determines whether the called IMS device 105, 106 supports network-based CID services by, for example, consulting and/or querying the HSS 150 via the example HSS interface 310. If the called device 105, 106 supports network-based CID services, the CID module 315 modifies the SIP INVITE message to include an early media indicator, and sends the modified SIP INVITE message to the called IMS device 105, 106. When the called device 105, 106 responds with a SIP 180 RINGING message containing a session descriptor for a RTP communication session by which an audible ringtone may be received, the CID module 315 directs and facilitates the establishment of the RTP communication session between the example messaging server 160 and the IMS device 105, 106.

While an example manner of implementing any or all of the example feature servers 155 and 156 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. Further, the example SIP interface 305, the example HSS interface 310, the example CID module 315 and/or, more generally, the example feature server 155 of FIG. 3 may be implemented by hardware, software, firmware and/or any combination of hardware, software and/or firmware. Thus, for example, any or the example SIP interface 305, the example HSS interface 310, the example CID module 315 and/or, more generally, the example feature server 155 may be implemented by one or more circuit(s), programmable processor(s), ASIC(s), PLD(s) and/or FPLD(s), etc. When any of the appended claims are read to cover a purely software implementation, at least one of the example SIP interface 305, the example HSS interface 310, the example CID module 315 and/or, more generally, the example feature server 155 are hereby expressly defined to include a tangible medium such as a memory, a DVD, a CD, etc. Further still, a feature server may include interfaces, data structures, elements, processes and/or devices instead of, or in addition to, those illustrated in FIG. 3 and/or may include more than one of any or all of the illustrated interfaces, data structures, elements, processes and/or devices.

FIG. 4 illustrates an example manner of implementing any or all of the example CID handlers 108 of FIG. 1. To control ringtone generation, the example CID handler 108 of FIG. 4 includes a ringtone controller 405. As directed by an early media handler 410, the example ringtone controller 405 of FIG. 4 controls the operation of a local ringtone generator 415. The example ringtone controller 405 can disable, enable and/or configure the ringtone generator 415 to, for example, suppress the presentation of a ringtone while the early media handler 410 seeks to receive a network-based ringtone. The ringtone controller 405 can also direct the ringtone generator 415 to present a streaming ringtone received by the early media handler 410. The example ringtone generator 415 of FIG. 4 presents ringtones and/or other types of call announcements via one or more aspects of a user interface 420 (e.g., via a speaker and/or screen).

To provide timer services, the example CID handler 108 of FIG. 4 includes any type of timer 425. The example timer 425 of FIG. 4 provides an API via which the timer 425 can be started, and provides a notification when a timeout timer expires.

To implement network-based CID services, the example CID handler 108 of FIG. 4 includes the example early media handler 410. When the example early media handler 410 of FIG. 4 receives a network-based ringtone notification (e.g., a SIP INVITE message containing an early-media indicator) it responds by sending a SIP 180 RINGING message containing a session descriptor for a real-time protocol (RTP) communication session by which an audible ringtone can be streamed to the early media handler 410. The example network-based ringtone notification and the SIP 180 RINGING messages are received and transmitted, respectfully, via any type of SIP interface 425. The example early media handler 410 of FIG. 4 receives the streaming audible ringtone via the RTP communication session, and directs the example ringtone controller 405 to present the received audible ringtone as it is received via the user interface 420.

When a user answers the incoming communication session (e.g., by pressing a key and/or button of the user interface 420), the example early media handler 410 of FIG. 4 terminates the RTP communication session, and the IMS device 105, 106 associated with the CID handler 108 establishes the original communication session requested by the calling IMS device 105, 106.

While an example manner of implementing any or all of the example CID handlers 108 of FIG. 1 has been illustrated in FIG. 4, one or more of the interfaces, data structures, elements, processes and/or devices illustrated in FIG. 4 may be combined, divided, re-arranged, omitted, eliminated and/or implemented in any other way. Further, the example ringtone controller 405, the example early media handler 410, the example ringtone generator 415, the example user interface 420, the example timer 425, the example SIP interface 425 and/or, more generally, the example CID handler 108 of FIG. 4 may be implemented by hardware, software, firmware and/or any combination of hardware, software and/or firmware. Thus, for example, any or the example ringtone controller 405, the example early media handler 410, the example ringtone generator 415, the example user interface 420, the example timer 425, the example SIP interface 425 and/or, more generally, the example CID handler 108 may be implemented by one or more circuit(s), programmable processor(s), ASIC(s), PLD(s) and/or FPLD(s), etc. When any of the appended claims are read to cover a purely software implementation, at least one of the example ringtone controller 405, the example early media handler 410, the example ringtone generator 415, the example user interface 420, the example timer 425, the example SIP interface 425 and/or, more generally, the example CID handler 108 are hereby expressly defined to include a tangible medium such as a memory, a DVD, a CD, etc. Further still, a CID handler may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
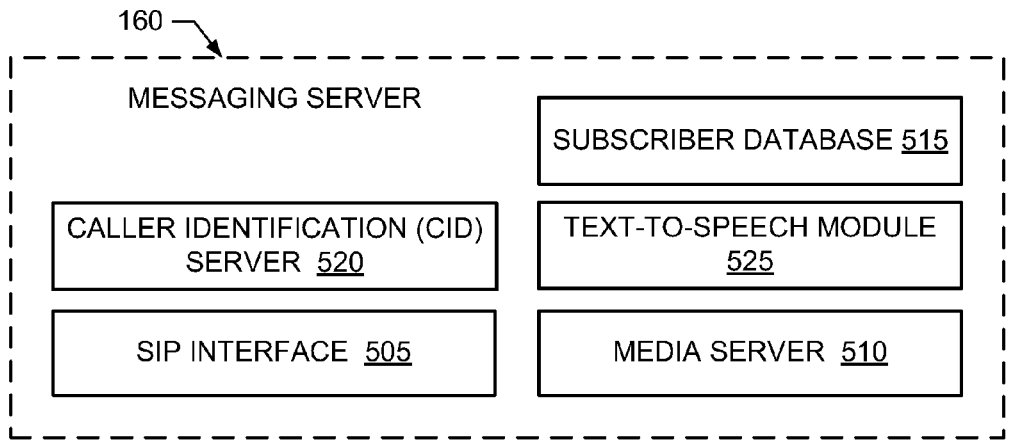
FIG. 5 illustrates an example manner of implementing the example messaging server of FIG. 1.

FIG. 5 illustrates an example manner of implementing the example messaging server 160 of FIG. 1. To allow the example messaging server 160 of FIG. 4 to process SIP messages, the example messaging server 160 includes a SIP interface 505. The example SIP interface 505 of FIG. 4 allows the messaging server 160 to exchange (e.g., send and/or receive) any number and/or type(s) of SIP messages with one or more other device(s) and/or server(s) of the example IMS communication system of FIG. 1 (e.g., any of the example S-CSCF servers 125 and 126, any or all of the example feature servers 155 and 156, and/or any of the example IMS devices 105 and 106).

To allow the example messaging server 160 of FIG. 4 to provide media streams, the messaging server 160 includes one or more media servers, one of which is designated in FIG. 5 with reference numeral 510. Using any suitable protocol(s), frame(s), packet(s) and/or format(s), the example media server 510 of FIG. 4 transmits, streams and/or otherwise provides media streams (e.g., audible ringtones) to other portions of an IMS network (e.g., a called IMS device 105, 106) and/or transmits media streams to other portions of the IMS network.

To manage subscribers, the example messaging server 160 of FIG. 5 includes a subscriber database 515. Using any number and/or type(s) of data structures, the example subscriber database 515 stores one or more messaging service parameters for a plurality of subscribers. Example parameters include one or more audible greetings recorded by a messaging service subscriber. The example subscriber database 515 may be stored in any number and/or type(s) or memory(-ies) and/or memory device(s).

To provide network-based CID services, the example messaging server 160 of FIG. 5 includes a CID server 520. When instructed by a feature server (e.g., any or all of the example feature servers 155 and 156 of FIG. 1) to provide a network-based audible ringtone, the example CID server 520 queries the example subscriber database 515 for an audible greeting that may be used as an audible ringtone. If a suitable audible greeting is not available (e.g., if the calling party does not subscribe to a messaging service provided by the messaging server 160), the CID server 520 directs a text-to-speech module 525 to generate an audible ringtone based on text-based CID information received from the feature server. The CID server 520 establishes a RTP communication session via which the CID server 520 provides the audible ringtone to the called party.

To perform text-to-speech conversions, the example messaging server 160 of FIG. 5 includes the example text-to-speech module 525. Using any number and/or type(s) of algorithms, logic and/or methods, the example text-to-speech module 525 generates audible data based on text-based information (e.g., text-based CID information).

While an example manner of implementing the example messaging server 160 of FIG. 1 has been illustrated in FIG. 5, one or more of the interfaces, data structures, elements, processes and/or devices illustrated in FIG. 5 may be combined, divided, re-arranged, omitted, eliminated and/or implemented in any other way. Further, the example SIP interface 505, the example media server 510, the example subscriber database 515, the example CID server 520, the example text-to-speech module 525 and/or, more generally, the example messaging server 160 of FIG. 5 may be implemented by hardware, software, firmware and/or any combination of hardware, software and/or firmware. Thus, for example, any or the example SIP interface 505, the example media server 510, the example subscriber database 515, the example CID server 520, the example text-to-speech module 525 and/or, more generally, the example messaging server 160 may be implemented by one or more circuit(s), programmable processor(s), ASIC(s), PLD(s) and/or FPLD(s), etc. When any of the appended claims are read to cover a purely software implementation, at least one of the example SIP interface 505, the example media server 510, the example subscriber database 515, the example CID server 520, the example text-to-speech module 525 and/or, more generally, the example messaging server 160 are hereby expressly defined to include a tangible medium such as a memory, a DVD, a CD, etc. Further still, a messaging server may include interfaces, data structures, elements, processes and/or devices instead of, or in addition to, those illustrated in FIG. 5 and/or may include more than one of any or all of the illustrated interfaces, data structures, elements, processes and/or devices.

Figure 6:
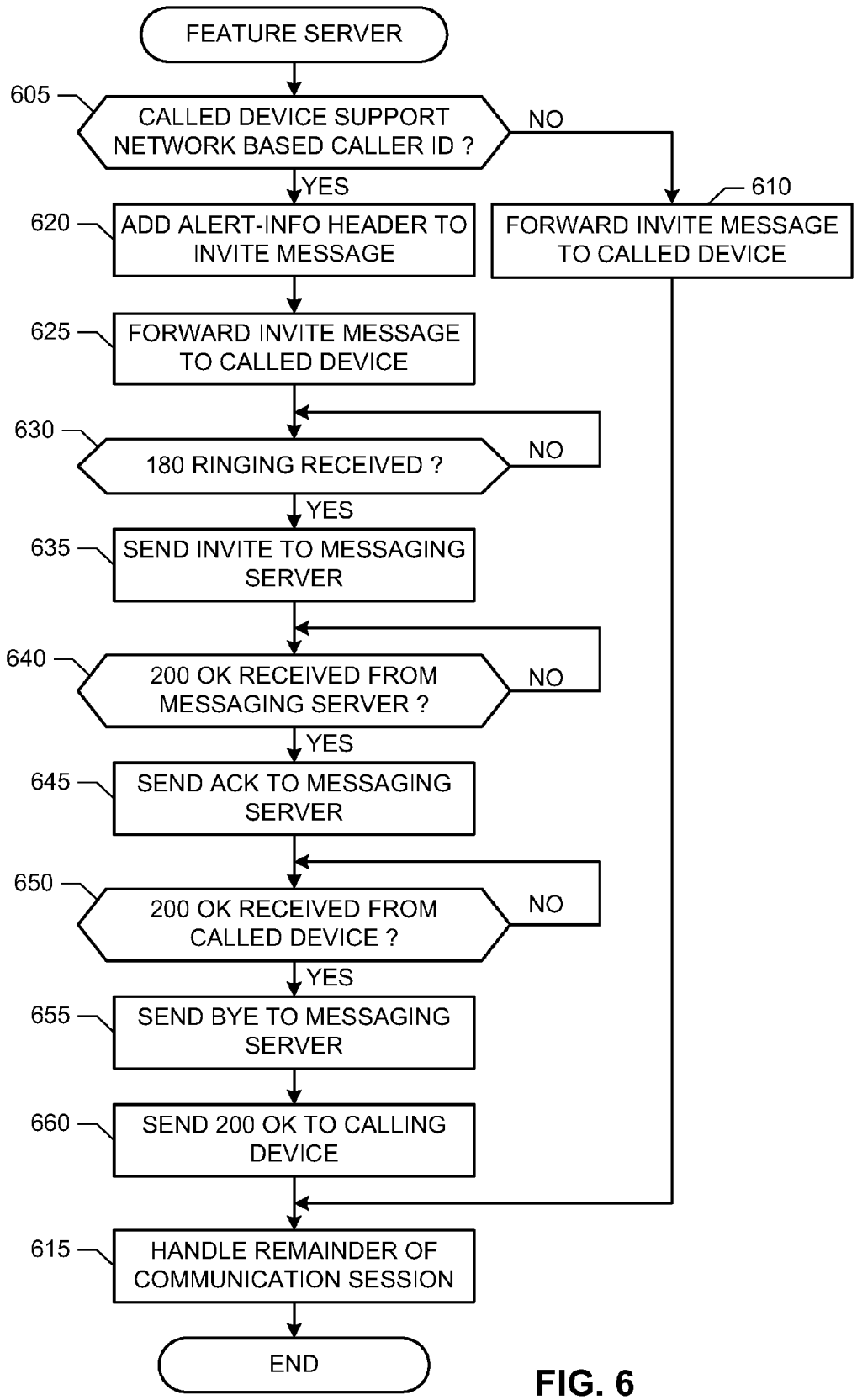
FIG. 6 is a flowchart representative of example machine accessible instructions that may be executed by, for example, a processor to implement any or all of the example feature servers of FIGS. 1 and/or 3.
Figure 7:
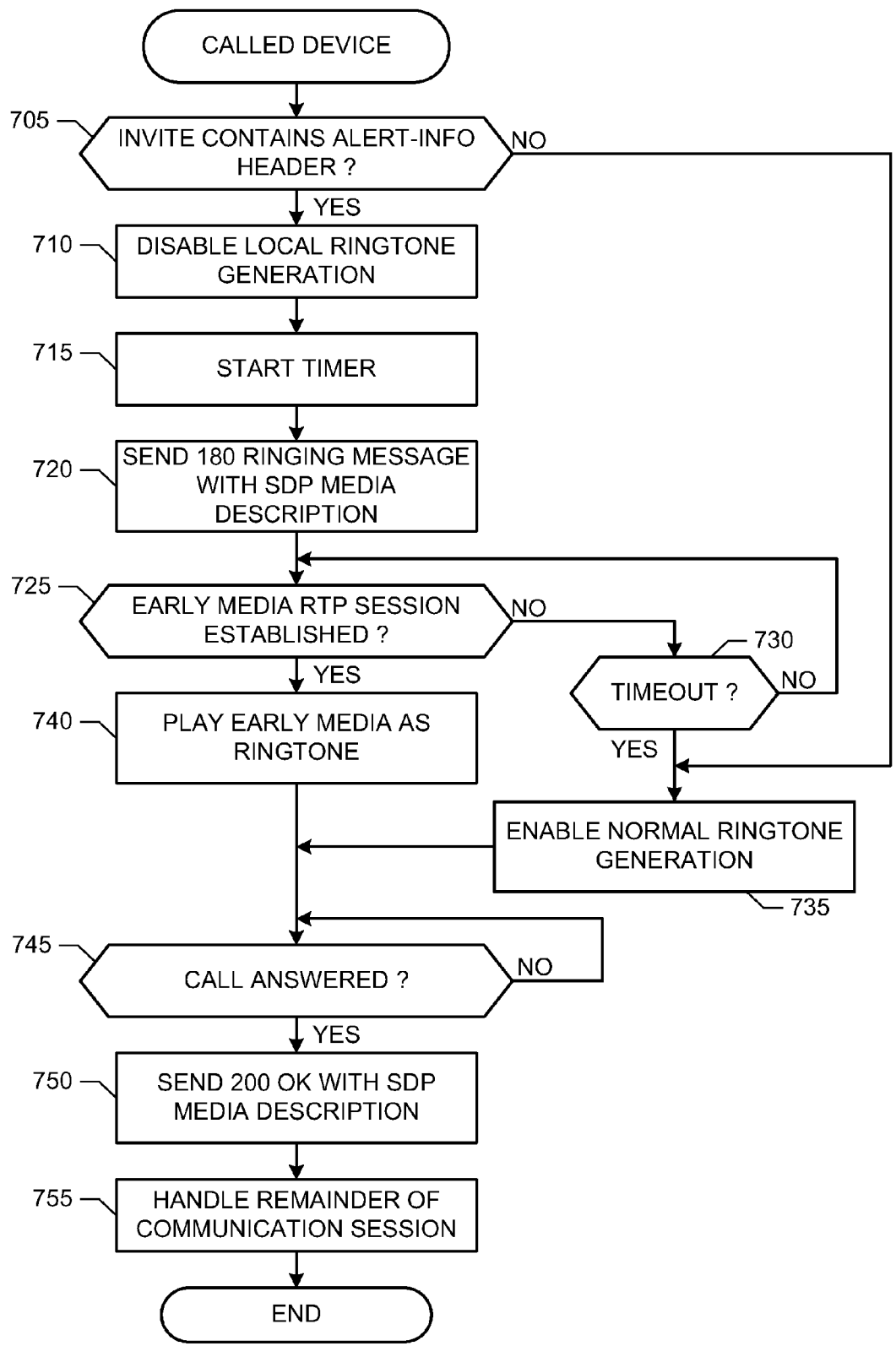
FIG. 7 is a flowchart representative of example machine accessible instructions that may be executed by, for example, a processor to implement any or all of the example IMS devices of FIGS. 1 and/or 4.
Figure 8:
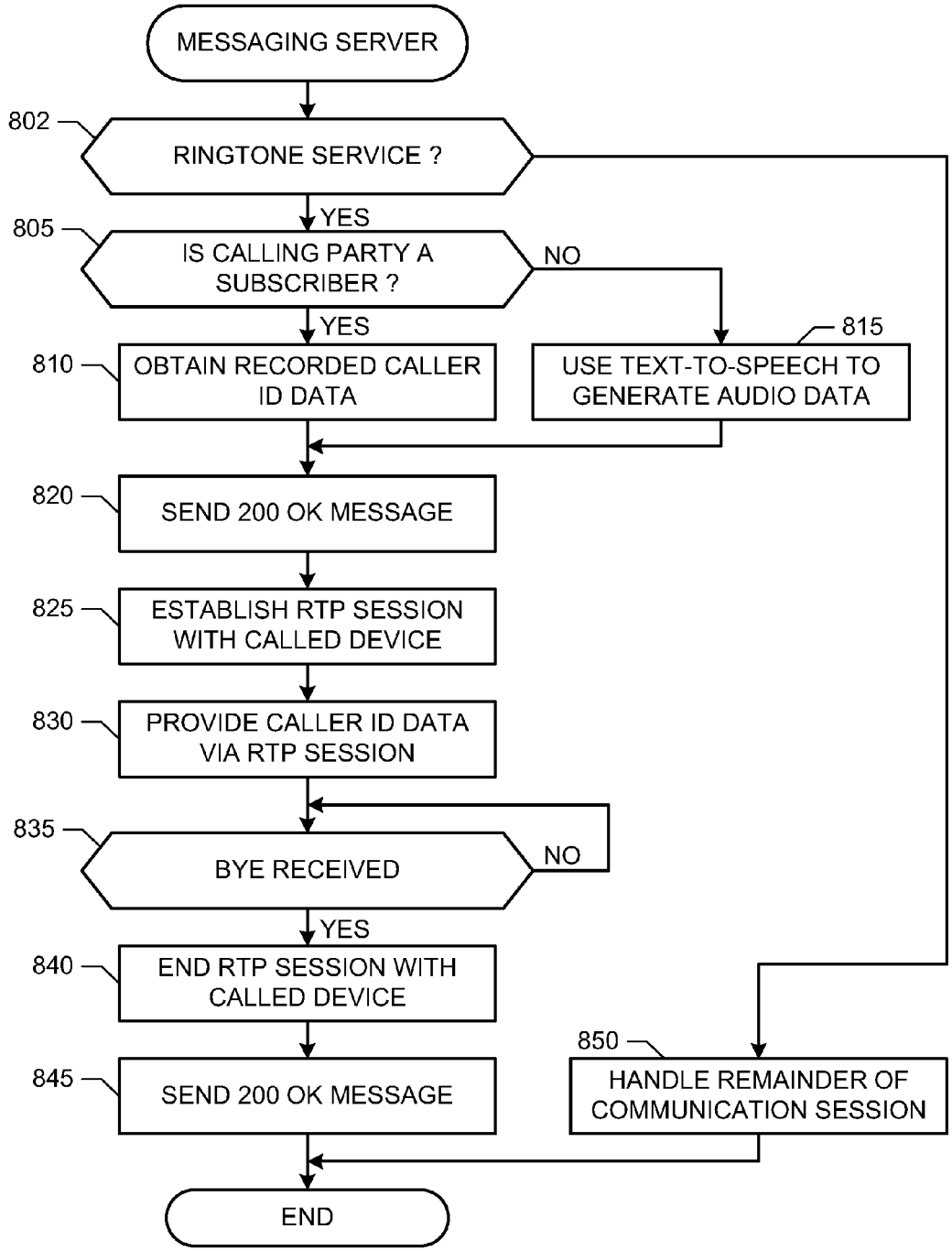
FIG. 8 is a flowchart representative of example machine accessible instructions that may be executed by, for example, a processor to implement any or all of the example messaging servers of FIGS. 1 and/or 5.

FIG. 6 illustrates example machine accessible instructions that may be executed to implement any or all of the example feature servers 155 and 156 of FIGS. 1 and/or 3. FIG. 7 illustrates example machine accessible instructions that may be executed to implement any or all of the example feature servers 155 and 156 of FIGS. 1 and/or 4. FIG. 8 illustrates example machine accessible instructions that may be executed to implement any or all of the example messaging servers 160 of FIGS. 1 and/or 5.

The example machine accessible instructions of FIGS. 6, 7, and/or 8 may be carried out by a processor, a controller and/or any other suitable processing device. For example, the example machine accessible instructions of FIGS. 6, 7, and/or 8 may be embodied in coded instructions stored on a tangible medium such as a flash memory, a ROM and/or RAM associated with a processor (e.g., the example processor 9005 discussed below in connection with FIG. 9). Alternatively, some or all of the example machine accessible instructions of FIGS. 6, 7, and/or 8 may be implemented using any combination(s) of ASIC(s), PLD(s), FPLD(s), discrete logic, hardware, firmware, etc. Also, some or all of the example machine accessible instructions of FIGS. 6, 7, and/or 8 may be implemented manually or as any combination of any of the foregoing techniques, for example, any combination of firmware, software, discrete logic and/or hardware. When any of the appended claims are read to cover a purely software implementation, at least one of the example feature servers 155 and 156, the example feature servers 155 and 156, or the example messaging servers 160 are hereby expressly defined to include a tangible medium such as a memory, a DVD, a CD, etc. Further, many other methods of implementing the example operations of FIGS. 6, 7, and/or 8 may be employed. For example, the order of execution of the blocks may be changed, and/or one or more of the blocks described may be changed, eliminated, sub-divided, or combined. Additionally, any or all of the example machine accessible instructions of FIGS. 6, 7, and/or 8 may be carried out sequentially and/or carried out in parallel by, for example, separate processing threads, processors, devices, discrete logic, circuits, etc.

The example machine accessible instructions of FIG. 6 begin when any of the example feature servers 155 and 156 of FIG. 1 receives a session initiation request message, such as the example SIP INVITE message 205 of FIG. 2 from the example calling device 105. The example CID module 315 of FIG. 3 determines whether the called party support a network-based CID service by, for example, accessing the example HSS interface 310 (block 605). If the called party does not support a network-based CID service (block 605), the CID module 315 forwards the SIP INVITE message to the called party (block 610). The feature server 155, 156 handles the remainder of the communication session as in a manner consistent with any past, present and/or future IMS network call processing (block 615). Control then exits from the example machine accessible instructions of FIG. 6.

Returning to block 605, if the called device supports a network-based CID service (block 605), the CID module 315 modifies the SIP INVITE message by adding an early-media indicator, such as an ALERT-INFO heading containing a value of EARLY-MEDIA (block 620), and sends the modified SIP INVITE message to the example called IMS device 106 (block 625).

When a SIP 180 RINGING message is received from the called IMS device 106 (block 630), the CID handler 315 sends a SIP INVITE message (e.g., the example SIP INVITE message 235 of FIG. 2) to the example messaging server 160 of FIG. 1 (block 635), and waits to receive a SIP 200 OK message from the messaging server 160 (block 640).

When a SIP 200 OK message is received from the messaging server 160 (block 640), the CID handler 315 sends a SIP ACK message to the messaging server 160 (block 645). The CID handler 315 then waits to receive a SIP 200 OK message from the called device 106 (block 650). The SIP 200 OK message will be received from the called device 106 when a user of the called device 106 answers the requested communication session.

Upon receipt of the SIP 200 OK message (block 650), the CID handler 315 sends a SIP 200 BYE message to the messaging server 160 to terminate the providing of the audible ringtone to the called device 106 (block 655), and forwards the SIP 200 OK message to the calling device 106 (block 660). The feature server 155, 156 handles the remainder of the communication session in a manner consistent with any past, present and/or future IMS network call processing (block 615). Control then exits from the example machine accessible instructions of FIG. 6.

The example machine accessible instructions of FIG. 7 begin when a called IMS device (e.g., any or all of the example IMS devices 105 and 106 of FIG. 1) receives a session initiation request message (e.g., the example SIP INVITE message 220 of FIG. 2). The example early media handler 410 of FIG. 4 determines whether the SIP INVITE message contains an early-media indicator (block 705). If the SIP INVITE message contains an early-media indicator (block 705), the example ringtone controller 405 disables a local ringtone generator 415 (block 710). The IMS device starts a timeout timer 425 (block 715).

The early media handler 410 sends a SIP 180 RINGING message containing a session descriptor for a RTP communication session via which an audible ringtone may be received (block 720) and checks whether the RTP communication session has been established (block 725).

If the RTP communication session has not been established (block 725) and the timeout timer 425 has not expired (block 730), control returns to block 725 to check whether the RTP communication session has been established. If the RTP communication session has not yet been established (block 725) and the timeout timer 425 has expired (block 730), the ringtone controller 405 enables the local ringtone generator 415 and directs the ringtone generator 415 to begin generating a local ringtone (block 735). If the RTP communication session has been established (block 725), the ringtone controller 405 directs the local ringtone generator 415 to present the received audible ringtone (block 740).

When the request communication session is answered (block 745), the early media handler 410 sends a SIP 200 OK message (block 750). The called IMS device handles the remainder of the communication session in a manner consistent with any past, present and/or future IMS network call processing (block 755). Control then exits from the example machine accessible instructions of FIG. 7.

Returning to block 705, if the received SIP INVITE message does not contain an early-media indicator (block 705), the ringtone controller 405 enables the local ringtone generator 415 and directs the ringtone generator 415 to begin generating a local ringtone (block 735). Control then proceeds to block 745 to wait for the communication session request to be answered by a user (block 745).

The example machine accessible instructions of FIG. 8 begin when the example messaging server 160 of FIG. 1 receives a SIP INVITE message (e.g., the example message 235 of FIG. 2) from any of the example feature servers 155 and 156. The example CID server 520 of FIG. 5 determines whether received message corresponds to a network-based ringtone service request (block 802). If the message corresponds to a network-based ringtone service request (block 802), the example CID server 520 determines whether the calling party subscribes to a messaging service provided by the messaging server 160 by, for example, querying the example subscriber database 515 (block 805). If the calling party is a subscriber (block 805), the CID server 520 obtains an audible greeting recorded by the calling party from the subscriber database 515 (block 810). If the calling party is not a subscriber (block 805), the example text-to-speech module 525 of the messaging server 160 generates an audible ringtone by converting text-based CID data into audible data (block 815).

The CID server 520 sends a SIP 200 OK message to the feature server (block 820). The example media server 510 of FIG. 5 establishes a RTP communication session with the called device 105, 106 based on a session descriptor received in the SIP INVITE message (block 825). The media server 510 provides the obtained or generated audible ringtone to the called device 105, 106 with the RTP communication session (block 830).

When a SIP BYE message is received (block 835), the media server 510 terminates the RTP communication server (block 840), and the CID server 520 of the messaging server 160 sends a SIP 200 OK message to the feature server 155, 156 (block 845). Control then exits from the example machine accessible instructions of FIG. 8.

Returning to block 802, if the received message does not correspond to a network-based ringtone service request (block 802), the example messaging server 160 handles message and/or communication session in a manner consistent with any past, present and/or future IMS network call processing (block 850). Control then exits from the example machine accessible instructions of FIG. 8.

Figure 9:
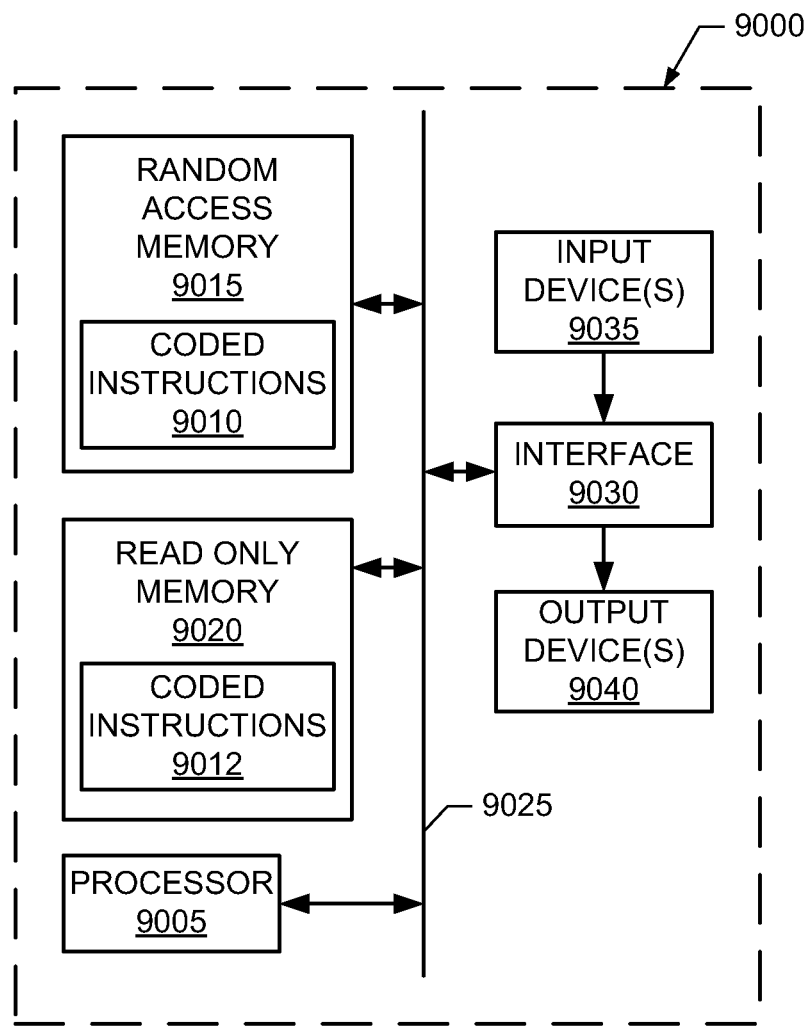
FIG. 9 is a schematic illustration of an example processor platform that may be used and/or programmed to carry out the example message exchanges and/or the example machine accessible instructions of FIGS. 2, 6, 7 and/or 8 to implement any of all of the example methods and apparatus described herein.

FIG. 9 is a schematic diagram of an example processor platform 9000 that may be used and/or programmed to implement all or a portion of any or all of the example IMS devices 105 and 106, the example CID handlers 108, the example features servers 155 and 156 and/or the example messaging servers 160 of FIGS. 1, 3, 4 and/or 5. For example, the processor platform 9000 can be implemented by one or more general purpose processors, processor cores, microcontrollers, etc.

The processor platform 9000 of the example of FIG. 9 includes at least one general purpose programmable processor 9005. The processor 9005 executes coded instructions 9010 and/or 9012 present in main memory of the processor 9005 (e.g., within a RAM 9015 and/or a ROM 9020). The processor 9005 may be any type of processing unit, such as a processor core, a processor and/or a microcontroller. The processor 9005 may execute, among other things, the example protocol message exchanges and/or the example machine accessible instructions of FIGS. 6, 7 and/or 8 to implement the example methods and apparatus described herein.

The processor 9005 is in communication with the main memory (including a ROM 9020 and/or the RAM 9015) via a bus 9025. The RAM 9015 may be implemented by DRAM, SDRAM, and/or any other type of RAM device, and ROM may be implemented by flash memory and/or any other desired type of memory device. Access to the memory 9015 and the memory 9020 may be controlled by a memory controller (not shown). One or both of the example memories 9015 and 9020 may be used to implement either or both of the example subscriber database 515 of FIG. 5.

The processor platform 9000 also includes an interface circuit 9030. The interface circuit 9030 may be implemented by any type of interface standard, such as an external memory interface, serial port, general purpose input/output, etc. One or more input devices 9035 and one or more output devices 9040 are connected to the interface circuit 9030. The input devices 9035 and/or output devices 9040 may be used to, for example, implement the example SIP interface 305, the example HSS interface 310, the example ringtone generator 415, the example user interface 420, the example timer 425, the example SIP interface 425, the example SIP interface 505, and/or the example media server 510 described herein.

Of course, the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
 modifying, with a processor, a communication session initiation request message when a called device supports a network-based caller identification service, the modification to add an early-media indicator in response to receiving the communication session initiation request message from a calling party;

sending, with the processor, the modified communication session initiation request message to the called device;

when the called device responds with a session descriptor for a real-time protocol communication session, directing, with the processor, a messaging server to provide caller identification data associated with the calling party to the called device via the real-time protocol communication session; and refraining from modifying the communication session initiation request message, with the processor, when the called device does not support the network-based caller identification service.

2. The method as defined in claim 1, further comprising sending a second communication session initiation request message to the messaging server, the second communication session initiation request message comprising the session descriptor and a feature identifier associated with the network-based caller identification service.

3. The method as defined in claim 1, wherein adding the early-media indicator comprises adding a session initiation protocol alert-info header containing a value of early-media.

4. The method as defined in claim 1, wherein the caller identification data comprises audible data recorded by the calling party via the messaging server.

5. The method as defined in claim 4, wherein the audible data comprises a spoken name.

6. The method as defined in claim 4, wherein the caller identification data is recorded while the calling party is initializing an associated messaging service account.

7. An apparatus comprising:
a memory comprising machine readable instructions; and
a processor to execute the instructions to provide a network-based caller identification service by:
when a called device supports a network-based caller identification service, modifying a communication session initiation request message received from a calling party to add an early-media indicator;
sending the modified communication session initiation request message to called device;
when the called device responds with a session descriptor for a real-time protocol communication session, directing a messaging server to provide caller identification data associated with the calling party to the called device via the real-time protocol communication session; and
refraining from modifying the communication session initiation request message when the called device does not support the network-based caller identification service.

8. The apparatus as defined in claim 7, wherein the processor is to send a second communication session initiation request message to the messaging server, the second communication session initiation request message comprising the session descriptor and a feature identifier associated with the network-based caller identification service.

9. The apparatus as defined in claim 7, wherein the processor is to add a session initiation protocol alert-info header containing a value of early-media.

10. The apparatus as defined in claim 7, wherein the processor is to provide video data recorded by the calling party via the messaging server.

11. The apparatus as defined in claim 10, wherein the processor is to provide a spoken name as audible data.

12. The apparatus as defined in claim 10, wherein the processor is to record the caller identification data while the calling party is modifying an associated messaging service account.

13. A tangible machine readable storage device comprising instructions which, when executed, cause a caller identification handler to perform operations comprising:
in response to receiving a communication session initiation request message from a calling party, modifying a communication session initiation request message to include an early media indicator when a called device supports a network-based caller identification service;
sending the modified communication session initiation request message to called device;
when the called device responds with a session descriptor for a real-time protocol communication session, directing a messaging server to provide caller identification data associated with the calling party to the called device via the real-time protocol communication session; and
refraining from modifying the communication session initiation request message when the called device does not support the network-based caller identification service.

14. The machine readable storage device as defined in claim 13, wherein the operations further comprise sending a second communication session initiation request message to the messaging server, the second communication session initiation request message comprising the session descriptor and a feature identifier associated with the network-based caller identification service.

15. The machine readable storage device as defined in claim 13, wherein the operations further comprise adding a session initiation protocol alert-info header containing a value of early-media.

16. The machine readable storage device as defined in claim 13, wherein the operations further comprise providing audible data recorded by the calling party via the messaging server.

17. The machine readable storage device as defined in claim 16, wherein the operations further comprise recording the caller identification data while the calling party is configuring an associated messaging service account.

\* \* \* \* \*